Jan. 10, 1939.  J. FLETCHER ET AL  2,143,191
GAS PURIFYING APPARATUS
Filed Feb. 19, 1935  4 Sheets-Sheet 1
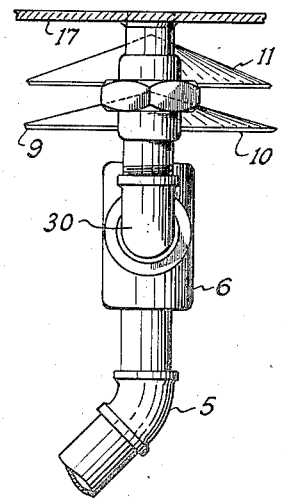
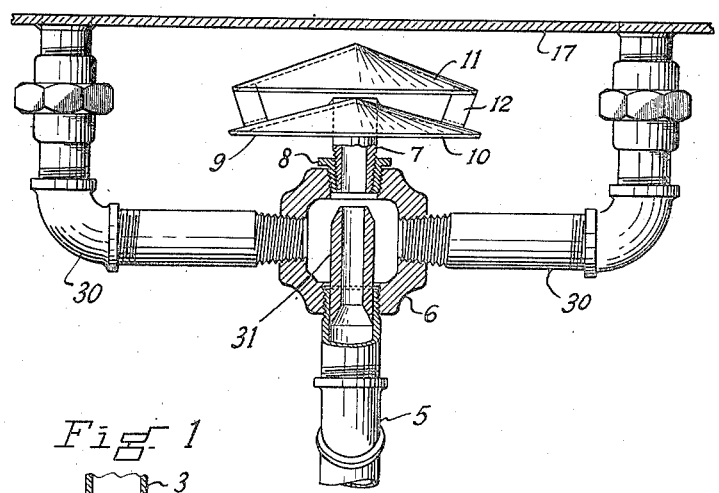
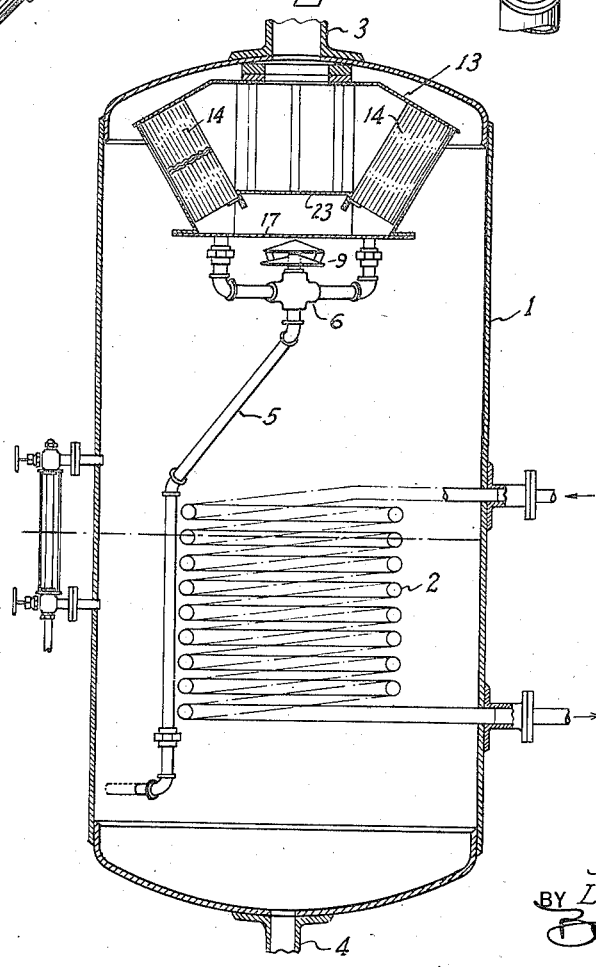
INVENTOR
James Fletcher
BY Lambert Kooistra
ATTORNEY Jan. 10, 1939.   J. FLETCHER ET AL   2,143,191
GAS PURIFYING APPARATUS
Filed Feb. 19, 1935   4 Sheets-Sheet 2

INVENTOR
James Fletcher
BY Lambert Kooistra
ATTORNEY

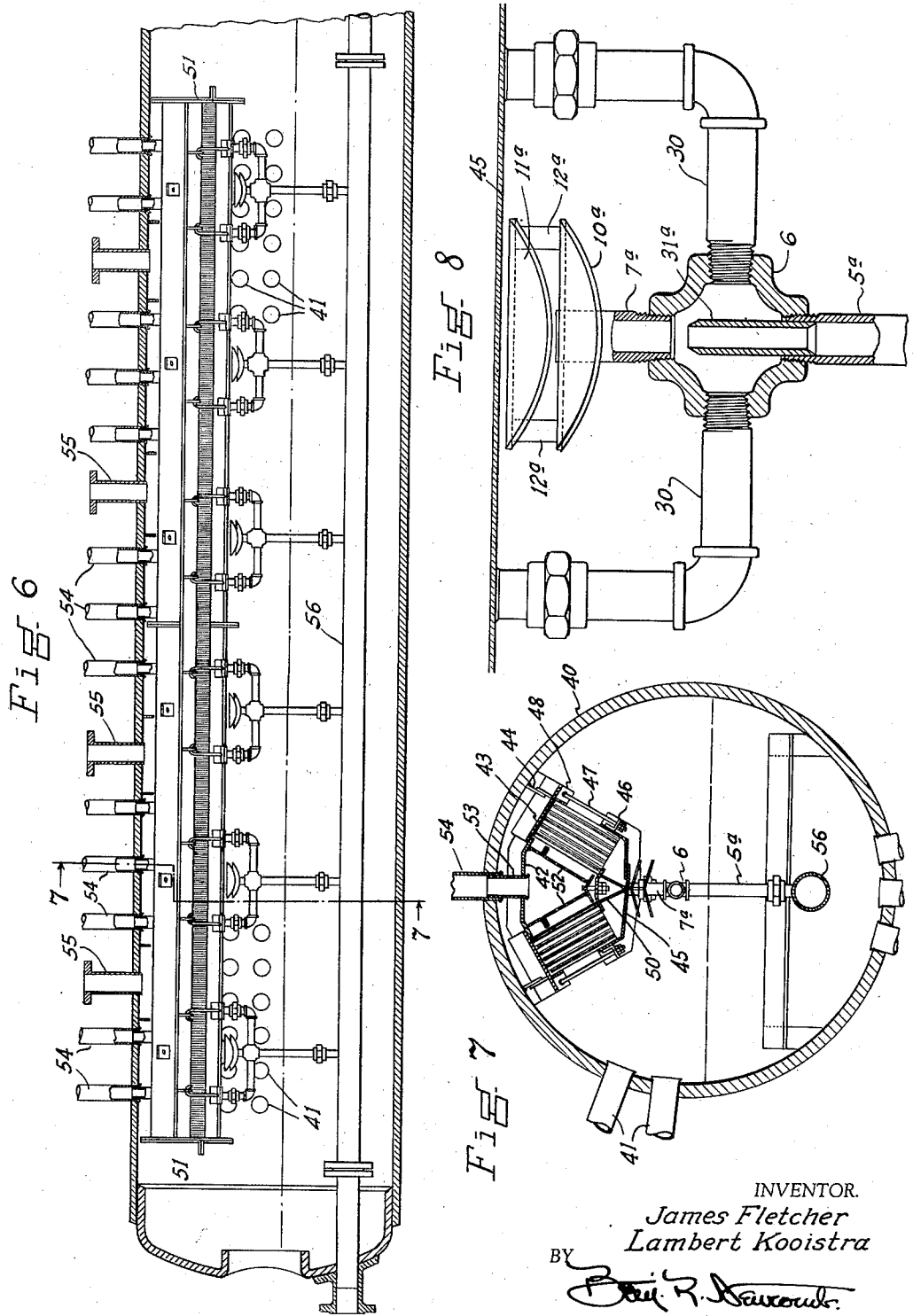

Jan. 10, 1939.  J. FLETCHER ET AL  2,143,191
GAS PURIFYING APPARATUS
Filed Feb. 19, 1935   4 Sheets-Sheet 4

INVENTOR.
James Fletcher
Lambert Kooistra
BY
ATTORNEY.

Patented Jan. 10, 1939

2,143,191

UNITED STATES PATENT OFFICE 2,143,191

GAS PURIFYING APPARATUS

James Fletcher, Akron, and Lambert Kooistra, Barberton, Ohio, assignors to The Babcock & Wilcox Company, Newark, N. J., a corporation of New Jersey Application February 19, 1935, Serial No. 7,188

22 Claims. (Cl. 122—491)

Our invention relates in general to the construction of gas purifying apparatus, and more particularly to gas purifying apparatus in which a wet gas is washed with a washing liquid of greater purity than the liquid carried by the gas and subjected to a separating action in which the suspended liquid is separated from the gas. The invention is especially applicable to the purification of wet steam to reduce the amount of solids carried over from the generator and depositing in the superheater, turbine, or other undesirable places.

The general object of our invention is the provision of gas purifying apparatus of the type described, which is characterized by improved means for washing the wet gas and removing the liquid separated by the subsequent separating action. A further object is the provision of improved constructions of apparatus of the type described which are especially adapted for installation in elongated casings of transverse circular cross-section. Another object is the provision of an improved evaporator construction including gas purifying apparatus.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of our invention.

Of the drawings:

Fig. 1 is a sectional elevation of an evaporator constructed in accordance with our invention;

Fig. 2 is an enlarged view partly in section of the separator drainage and gas washing provisions shown in Fig. 1;

Fig. 3 is an end view of the parts shown in Fig. 2;

Fig. 6 is a sectional elevation of a steam boiler drum constructed in accordance with our invention;

Fig. 7 is a section taken on the line 7—7 of Fig. 6;

Fig. 8 is an enlarged side view partly in section of the separator drainage and gas washing provisions shown in Figs. 6 and 7.

Figure 5:
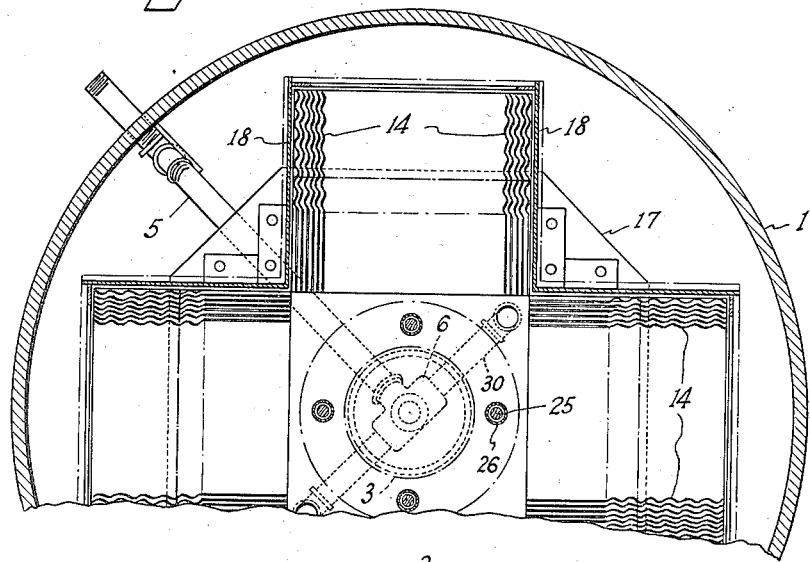
Fig. 5 is a horizontal section taken on the line 5—5 of Fig. 4.

In Figs. 1 to 5, the reference numeral 1 designates a vertically elongated evaporator casing of horizontal circular cross-section having a submerged heating coil 2 in its lower section, a central steam outlet 3 in its top, and a water drain connection 4 in its bottom. In operation, the coil 2 is supplied with a suitable heating fluid to evaporate the surrounding water. The wet steam generated will have a substantial amount of solids in solution or suspension in the moisture carried by the steam, which are desirably removed before the delivery of the steam to the point of use.

In accordance with our invention the evaporator casing contains improved provisions for washing the steam and then separating therefrom substantially all of the suspended moisture so that the steam leaving the evaporator will be in a substantially dry purified condition. The ascending wet steam is required to pass through a screen or curtain of water of greater purity than the moisture carried by the steam, so that the suspended moisture will be replaced by moisture of greater purity. For this purpose, feed water is supplied under pressure to a pipe 5 passing upwardly through the casing to a point above the water level therein. The upper end of the pipe 5 is connected to a cross fitting 6 having a nozzle 7 held in the upper end thereof in axial alignment with the discharge end of the pipe 5 by a bushing 8. The nozzle 7 forms part of a sprayer head 9 for distributing the feed water throughout the cross-section of the casing. The nozzle 7 carries on its upper or discharge end a pair of vertically spaced conical distributing plates 10 and 11, the lower plate 10 surrounding and being secured directly to the nozzle 7 and the plate 11 being held in spaced relation by interplate struts 12. With this arrangement of the parts, the feed water supplied will be discharged from the nozzle 7 against the under side of the conical plate 11 and be dispersed outwardly between the plates 10 and 11 in a conical sheet uniformly distributed throughout the cross-sectional area of the casing 1. The wet steam ascending to the casing outlet is thus forced to pass through a curtain of relatively pure water which will replace the moisture carried by the steam. The remaining wash water and separated moisture fall into the water pool in the bottom of the evaporator, and are subsequently evaporated by the heating fluid.

Figure 4:
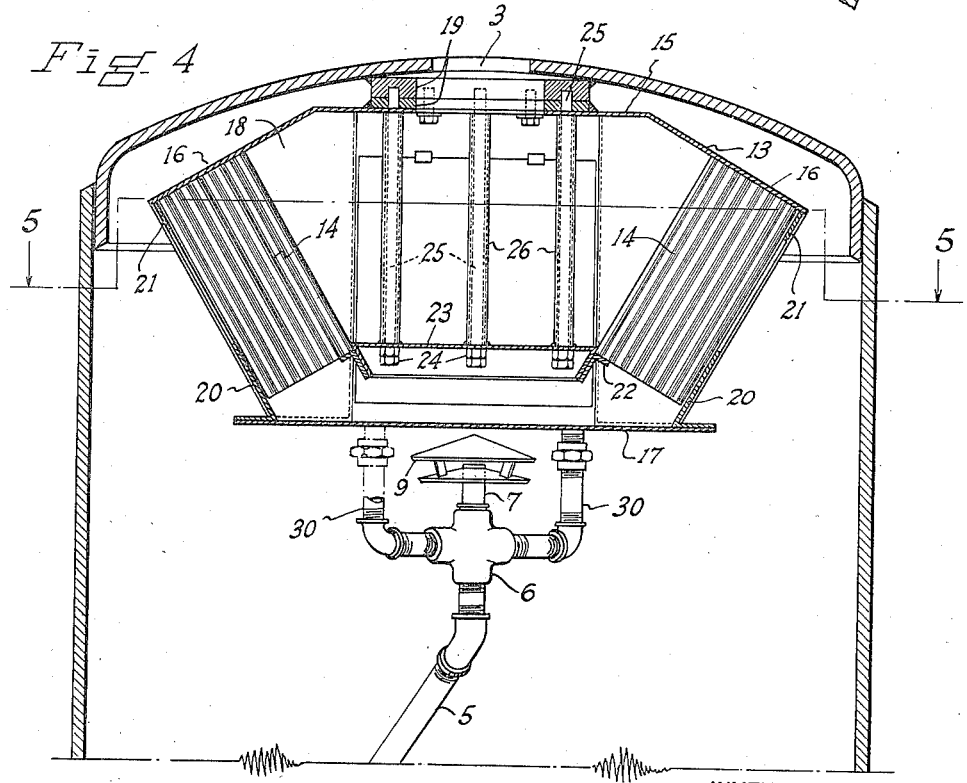
Fig. 4 is an enlarged view of the upper portion of Fig. 1.

In Figs. 1, 4 and 5 is illustrated a steam and water separator especially adapted for use with the washing provisions described. The separator has a housing 13 formed by a plurality of welded plates and in the form of a Greek cross in plan, as shown in Fig. 5. The housing is positioned in the upper end of the casing with its arms symmetrically arranged relative to the casing outlet. A separator section is arranged in each arm of the housing and is formed by a series of inclined rectangular corrugated plates 14 having uniform corrugations extending substantially transversely of the general direction of steam flow relative thereto. The plates are arranged side-by-side and spaced to form narrow parallel undulating channels therebetween through which the steam passes. The tilted position of the plates expedites the drainage of moisture separating from the steam and adhering to the plates.

The separator housing 13 comprises a cruciform top plate 15 having downwardly inclined arms 16. The bottom of the housing is formed by a flat octagonal plate 17. The sides of adjoining housing arms are closed by angle plates 18 having their upper and lower ends welded to the plates 15 and 17 respectively. The top plate 15 is provided with a central discharge opening registering with the discharge opening in one or more ring members 19 and the casing outlet 3. The rings 19 are welded to the top of the casing and the separator housing is welded and bolted to the rings. The separator plates are shown with their lower ends terminating above the bottom plate 17, the space therebetween being closed by an angle plate 20 which cooperates with an upper plate 21 to restrict the inlet area of the steam channels relative to their outlet area. The plates 14 are supported at their lower inner corners by angle bars 22 carried by an inner bottom plate 23 having a flat central section and downwardly converging edge portions, to which bars 22 are connected. The space between the plates 15 and 23 serves as a dry gas chamber into which all of the separator sections discharge, and the space between the bottom plates 17 and 23 serves as a drain chamber common to and directly communicating with the lower ends of all of the separator plate channels throughout a substantial portion of their length. The plate 23 is supported in fixed spaced relation relative to the top plate 15 by being welded to the side plates 18 and by rods 25 having their upper ends threaded into the rings 19 and their lower threaded ends extending through the bottom plate 23 and held by nuts 24. Spacers 26 surround the rods 25 and hold the plates 15 and 23 spaced apart.

With this separator construction, the wet steam will pass inwardly through the channels formed in each separator section, the undulating path intensifying the contact with the moisture separating plates, whereby substantially all of the moisture carried by the steam will adhere to the plates 14 and flow downwardly along the plate corrugations through the open bottom of each channel into the common drain chamber out of the path of steam flow. The dry steam passes into the common dry steam space above the bottom plate 23 and then through the steam outlet 3.

In accordance with our invention, the drainage of the separator sections is improved by connecting a pair of drain conduits 30 opening to the drain chamber to an ejector incorporated in the sprayer head supply line, whereby the incoming feed water will serve as the motive fluid and the separated moisture will be delivered to the sprayer head. As shown in Fig. 2, an ejector nozzle 31 of reduced diameter is mounted in the end of the feed water supply pipe 5 opening into the cross fitting 6. The conduits 30 are connected to the cross at opposite sides of and below the end of the nozzle 31. The nozzle 31 is in axial alignment with and of smaller flow area than the nozzle 7, which serves as the combining tube of the ejector. The suction effected by the feed water on the drain pipes thus aids the removal of the separated moisture. While the separated water contaminates the feed water to some extent, the added volume of wash water increases the beating action of the wash water on the wet steam and aids the replacement of the suspended moisture by the purer wash water. In prior separator constructions in which the separated liquid is removed by gravity drain pipes sealed in the liquid pool, it has been necessary to maintain a substantial distance between the separator and the liquid pool level to compensate for the pressure drop through the separator sections. The present drainage system provides a positive draining action supplemental to the draining action due to the distance between the separator and the liquid pool level, thereby permitting higher liquid levels to be maintained in existing constructions and lower casings for a predetermined liquid level.

The desired purifying apparatus is especially useful in evaporators because of the normally high solid concentrations in the liquid pool, substantial amount of liquid particles in the vapor generated, and high degree of purity of product usually required. The high degree of wetness of the vapor generated is mainly due to the substantially lower operating pressures normally maintained in evaporators as compared to the operating pressures in steam boilers, for example.

The described construction and arrangement of the purifying apparatus is particularly advantageous in a vertical casing of horizontal circular cross-section, as the cruciform separator housing permits the installation of a maximum number of corrugated plates in any given casing diameter when the corrugated plates are built in rectangular sections, which form is most desirable from a manufacturing viewpoint. The location of the washing provisions below the separator permits its utilization in assisting the separator drainage, and reduces the solid deposits on the separator plates which have been found to occur when washing provisions are located directly in front of the separator sections or in the entrance end of the plate channels.

In Figs. 6 to 10 we have illustrated various modifications of purifying apparatus constructed in accordance with our invention, especially adapted for use in a horizontally elongated casing of vertical circular cross-section, such as a cross drum of a steam boiler. In the form shown in Figs. 6 to 8 the separator sections are arranged in a single twin formation substantially as disclosed in a prior patent of James Fletcher, No. 2,007,966. In this construction the boiler steam and water drum 40 has a plurality of rows of steam and water circulators 41 connected thereto along one side thereof above the normal water level therein, as indicated in Figs. 6 and 7. The two series of oppositely inclined corrugated separator plates 14 are arranged at opposite sides of the vertical center line of the drum in a housing having a central top plate 42 welded to a pair of inclined outer top plates 43 supported from the adjacent drum wall by bars 44. The bottom of the housing is formed by overlapping welded plates 45 carrying at their outer ends spaced angles 46 through which extend supporting hook bolts 47. The hooked end of the bolts 47 engage vertical flanges 48 depending from the plates 43 at the outer end thereof. The lower inner corners of the plate sections are supported by a plate 49 and space V-bars 50. The plate 49 unites with the bottom plates 45 to form the drain chamber. The ends of the separator housing are closed, as shown in Fig. 6, by end plates 51, thus preventing any steam by-passing the separator sections. A pair of upper diverging perforated plates 52 are arranged at the discharge side of the separator sections and unite with the top plate 42 to form a dry steam chamber which is connected along its length by nipples 53 to the steam outlet pipes 54. The drum is provided at longitudinally spaced points with safety valve connections 55 which open to the drum above the separator and through which, when the safety valves are operated, steam may flow without passing through the separator.

The steam washing and separator drainage provisions in the construction shown in Figs. 6–8 are constructed and arranged substantially the same as in Figs. 1–5, except that a series of sprayer heads are positioned along the drum and the distributing plates 10ᵃ and 11ᵃ of each sprayer head are of inverted V-shaped formation instead of the conical formation of Figs. 1–5. The plates 10ᵃ and 11ᵃ are formed by bending discs along a diameter, and the plates are preferably arranged with their apices above and in vertical alignment with the longitudinal axis of the drum. The distributing plates are connected by struts 12ᵃ extending between their apices. The upper plate 11ᵃ is preferably bent to a slightly greater extent than the lower plate 10ᵃ to improve the distribution of the wash water delivered by the nozzle 7ᵃ from the feed water pipes 5ᵃ and drain pipes 30. The pipes 5ᵃ are connected to a feed water main 56 extending along the bottom of the drum, and preferably having a flow area nearly twice the aggregate flow area of the nozzles 31ᵃ.

With this construction the wet steam entering the drum through the circulators 41 will pass through and be washed by the V-shaped sheet of wash water extending across both sides of the drum before entering the separator. The moisture carried by the washed steam is separated as previously described in the separator sections and withdrawn through the pipes 30 by the ejector action of the feed water being delivered to the sprayer heads.

Figure 9:
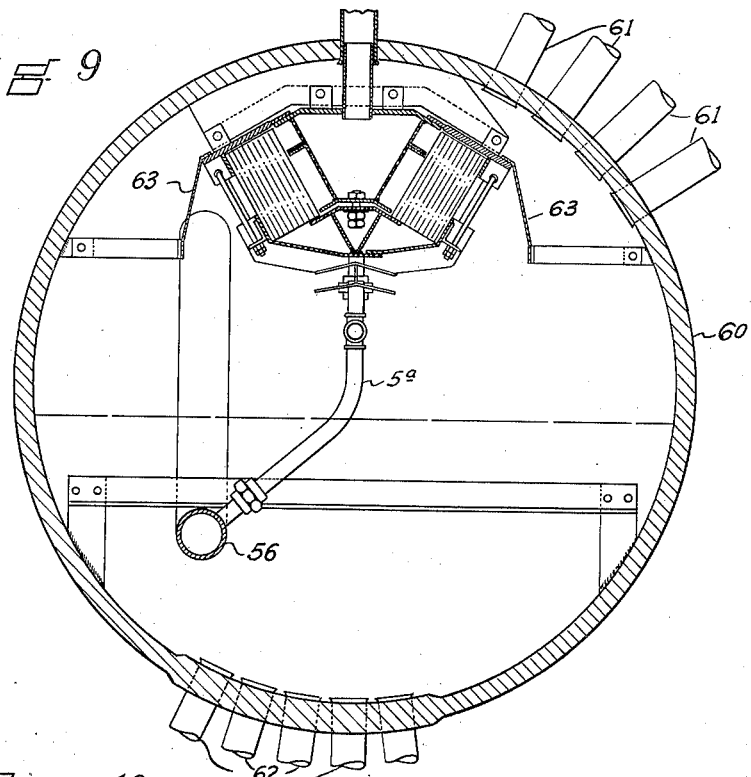
Figs. 9 and 10 are views similar to Fig. 7 of modified boiler drum constructions.

In Fig. 9, the steam purifying apparatus illustrated in Figs. 6–8, is shown as installed in the steam and water drum 60 of a Stirling type boiler, having steam and water circulators 61 and downcomers 62 arranged as shown. Each of the separator sections is advantageously provided with a depending baffle 63 extending outwardly at its inlet side to cause the wet steam entering the drum to be directed downwardly into the zone of action of the sprayer heads, before entering the steam and water separator. The feed water main 56 is laterally offset to permit access to the downcomer tubes 62.

Figure 10:
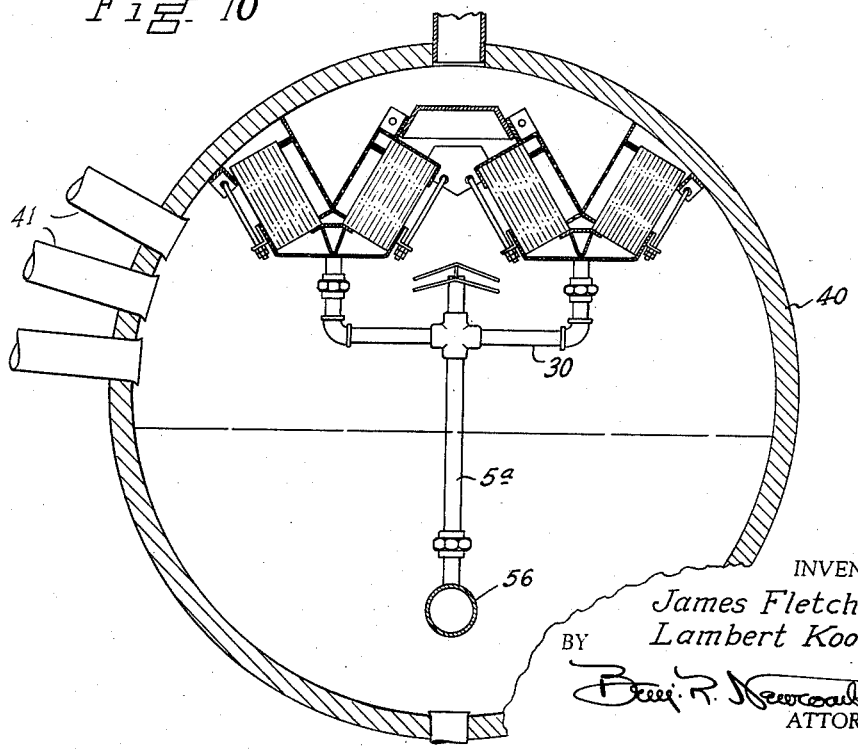

In Fig. 10 another modified construction is shown adapted for installation in steam and water drums requiring a large separating capacity and comprising a double twin arrangement of the separator sections with the two sets of separator sections arranged side-by-side and symmetrical relative to the longitudinal axis of the drum. The pairs of separator sections have common steam outlets, drainage and washing provisions with one drain pipe 30 connecting each pair of sections to the corresponding sprayer head.

While in accordance with the provisions of the statutes we have illustrated and described herein the best forms of our invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. Apparatus for purifying a wet gas comprising a casing having a gas outlet at its upper end, gas and liquid separating means in the path of wet gas passing to said outlet, and means in said gas space for washing the wet gas with a liquid of greater purity than the liquid carried by the gas, said washing means being connected to and arranged to receive the drainage of said separating means.

2. Apparatus for purifying a wet gas comprising a casing having an upper gas space and a lower liquid space, a gas outlet from the upper end of said gas space, gas and liquid separating means in said gas space in the path of wet gas ascending to said outlet, and means in said gas space below said separating means for washing the wet gas with a liquid of greater purity than the liquid carried by the gas, said washing means being connected to and arranged to receive the drainage of said separating means.

3. Apparatus for purifying a wet gas comprising a casing having a gas outlet in its upper end, a gas and liquid separator in the upper part of said casing in the path of wet gas ascending to said outlet, and means positioned in the path of the wet gas passing to said separator for washing the wet gas with a liquid of greater purity than the liquid carried by the gas, said washing means comprising an ejector delivering a washing liquid thereto, and a drain conduit connecting said separator with said ejector for delivering separated liquid to said washing means.

4. Apparatus for purifying a wet gas comprising a casing having a gas outlet in its upper end, a gas and liquid separator in the upper part of said casing in the path of wet gas ascending to said outlet, and means positioned in the path of the wet gas passing to said separator for washing the wet gas with a liquid of greater purity than the liquid carried by the gas, said washing means comprising a sprayer head having an ejector delivering a washing liquid thereto, and a drain conduit connecting said separator with said ejector for delivering separated liquid to said sprayer head.

5. Apparatus for purifying a wet gas comprising a horizontally elongated casing having an upper gas space, a gas outlet from said gas space, and means in said gas space for washing wet gas passing to said outlet, said means comprising an upwardly discharging nozzle and an inverted V-shaped dispersion plate receiving the impact of and dispersing the liquid discharged by said nozzle, the apex of said plate extending substantially parallel to the longitudinal axis of said casing.

6. Apparatus for purifying a wet gas comprising a horizontally elongated casing of circular transverse cross-section having an upper gas space and a lower liquid space, a gas outlet from said gas space, and means in said gas space for washing wet gas passing to said outlet with a liquid of greater purity than the liquid carried by the gas, said means comprising an upwardly discharging nozzle and a pair of vertically spaced inverted V-shaped dispersion plates mounted on and arranged with said nozzle opening therebetween, the apices of said plates extending substantially parallel to the longitudinal axis of said casing.

7. Apparatus for purifying a wet gas comprising a vertical casing having a gas outlet in its upper end, and a gas and liquid separator in said casing having plates arranged to form a substantially cruciform housing, a separator section in each arm of said housing, said housing having a drain chamber common to and directly communicating with the lower ends of said separator sections, means forming a gas space in said housing between said separator sections and above and separated from said drain chamber, means connecting said housing gas space to said outlet, and means for draining the separated liquid from said drain chamber.

8. Apparatus for purifying a wet gas comprising a vertical casing having a gas outlet in its upper end, and a gas and liquid separator in said casing having plates arranged to form a substantially cruciform housing, a separator section in each arm of said housing including a series of liquid separating plates having channels therebetween closed at their upper ends, said housing having a drain chamber common to and directly communicating with the lower ends of all of said channels throughout a substantial portion of their length, means forming a gas space in said housing between said separator sections and communicating with the gas discharge ends of said channels and above and separated from said drain chamber, means connecting said housing gas space to said outlet, and means for draining the separated liquid from said drain chamber.

9. Apparatus for purifying a wet gas comprising a vertical casing having a gas outlet in its upper end, and a gas and liquid separator in said casing having plates arranged to form a substantially cruciform housing, a separator section in each arm of said housing including a series of corrugated plates having their corrugations extending substantially transversely of the general direction of gas flow relative thereto, means for holding said corrugated plates in side-by-side relation to form narrow undulating channels therebetween, said housing having a drain chamber common to and directly communicating with the lower ends of all of said channels throughout a substantial portion of their length, means forming a gas space in said housing between said separator sections and communicating with the gas discharge ends of said channels and above and separated from said drain chamber, means connecting said housing gas space to said outlet, and means for draining the separated liquid from said drain chamber.

10. Apparatus for purifying a wet gas comprising a vertical casing of circular transverse cross-section having a gas outlet centrally arranged in its upper end, and a gas and liquid separator in said casing having plates arranged to form a substantially cruciform housing with its arms symmetrically arranged relative to said gas outlet, a separator section in each arm of said housing, said housing having a drain chamber common to and directly communicating with the lower ends of said separator sections, means forming a gas space in said housing between said separator sections and communicating with the gas discharge ends thereof and above and separated from said drain chamber, means connecting said housing gas space to said outlet, and means for draining the separated liquid from said drain chamber.

11. Apparatus for purifying a wet gas comprising a vertical casing of circular transverse cross-section having a gas outlet centrally arranged in its upper end, and a gas and liquid separator in said casing having plates arranged to form a substantially cruciform housing with its arms symmetrically arranged relative to said gas outlet, a separator section in each arm of said housing including a series of corrugated plates having their corrugations extending substantially transversely of the general direction of gas flow relative thereto, means for holding said corrugated plates in side-by-side relation to form narrow undulating channels therebetween, said housing having a drain chamber common to and directly communicating with the lower ends of all of said channels throughout a substantial portion of their length, means forming a gas space in said housing between said separator sections and communicating with the gas discharge ends of said channels and above and separated from said drain chamber, means connecting said housing gas space to said outlet, and means for draining the separated liquid from said drain chamber.

12. Apparatus for purifying a wet gas comprising a casing having a gas outlet in its upper end, a gas and liquid separator in the upper portion of said casing, a drain pipe opening to said separator, means positioned below said separator for washing the wet gas with a liquid of greater purity than the liquid carried by the gas, a wet gas inlet to said casing at one side of said separator and above said gas washing means, and baffle means for directing the wet gas downwardly into the washing zone before passing into said separator.

13. Apparatus for purifying a wet gas comprising a horizontally elongated drum having a gas outlet in its upper end, gas and liquid separating means in the upper portion of said drum including twin pairs of oppositely inclined separator sections arranged at opposite sides of said gas outlet at opposite sides of the vertical central plane longitudinally of said drum, each pair of sections having a dry gas space therebetween communicating with said gas outlet, each separator section comprising a series of corrugated plates having their corrugations extending substantially transversely of the general direction of gas flow relative thereto, means for holding said plates in side-by-side relation to form narrow undulating channels therebetween, a bottom plate extending between the lower outer corners of each pair of separator sections to form a drain chamber directly communicating with the lower ends of said channels throughout a substantial portion of their length, and common means for draining said twin pairs of separator sections.

14. An evaporator comprising a vertically disposed casing having an upper gas space and a lower liquid space, a gas outlet from the upper end of said gas space, heat transfer surface in said liquid space for evaporating liquid therein, gas and liquid separating means in said gas space in the path of wet gas ascending to said outlet, and means in said gas space below said separating means and symmetrically arranged relative to said casing for washing the wet gas with a liquid of greater purity than the liquid carried by the gas, said washing means being connected to and arranged to receive the drainage of said separating means.

15. Apparatus for conditioning a gas comprising a casing having a gas space in its upper end with a gas outlet therefrom, a gas and liquid separator in said gas space having a series of plates having channels therebetween extending substantially transversely of the general direction of gas flow relative thereto and a drain chamber communicating with the lower ends of said channels, means for draining the separated liquid from said drain chamber and washing the gas prior to entering said separator sections including a sprayer head in said gas space having an ejector delivering a washing liquid thereto, and a drain conduit connecting said drain chamber with said ejector for delivering liquid separated in said separator to said sprayer head.

16. Apparatus for conditioning a gas comprising a casing having a gas space in its upper end with a gas outlet therefrom, a gas and liquid separator in said gas space having plates arranged to form a housing having a plurality of arms, a separator section in each arm of said housing, said housing having a drain chamber communicating with the lower ends of said sections, means forming a gas space in said housing between said separator sections and above and separated from said drain chamber, means connecting said housing gas space to said outlet, means for draining the separated liquid from said drain chamber and washing the gas prior to entering said separator sections including a sprayer head in said gas space below said separator having an ejector delivering a washing liquid thereto, and a drain conduit connecting said drain chamber with said ejector for delivering liquid separated in said sections to said sprayer head.

17. Apparatus for conditioning a gas comprising a casing having a gas space in its upper end with a gas outlet therefrom, a gas and liquid separator in said gas space having plates arranged to form a housing having a plurality of arms symmetrically arranged relative to said gas outlet, a separator section in each arm of said housing, said housing having a drain chamber common to and directly communicating with the lower ends of said sections, means forming a gas space in said housing between said separator sections and communicating with the gas discharge ends of said channels and above and separated from said drain chamber, means connecting said housing gas space to said outlet, means for draining the separated liquid from said drain chamber and washing the gas prior to entering said separator sections including a sprayer head in said gas space below said separator having an ejector delivering a washing liquid thereto, and a drain conduit connecting said drain chamber with said ejector for delivering liquid separated in said sections to said sprayer head.

18. Apparatus for conditioning a gas comprising a casing having a gas space in its upper end with a gas outlet therefrom, a gas and liquid separator in said gas space having plates arranged to form a housing having a plurality of arms symmetrically arranged relative to said gas outlet, a separator section in each arm of said housing including a series of corrugated plates having their corrugations extending substantially transversely of the general direction of gas flow relative thereto, means for holding said corrugated plates in side-by-side relation to form narrow undulating channels therebetween closed at their upper ends, said housing having a drain chamber common to and directly communicating with the lower ends of said channels throughout a substantial portion of their length, means forming a gas space in said housing between said separator sections and communicating with the gas discharge ends of said channels and above and separated from said drain chamber, means connecting said housing gas space to said outlet, means for draining the separated liquid from said drain chamber and washing the gas prior to entering said separator sections including a sprayer head in said gas space below said separator having an ejector delivering a washing liquid thereto, and a drain conduit connecting said drain chamber with said ejector for delivering liquid separated in said sections to said sprayer head.

19. Apparatus for purifying a wet gas comprising a casing having a gas space in its upper end with a gas outlet therefrom, a gas and liquid separator in said gas space including a plurality of separator sections symmetrically arranged relative to said gas outlet and having a gas space therebetween connected to said gas outlet, means for washing the wet gas prior to its entry into said separator sections with a liquid of greater purity than the liquid carried by the gas comprising a sprayer head in said gas space below and symmetrically arranged relative to said separator sections and means for delivering washing liquid to said sprayer head.

20. Steam generating apparatus comprising a casing having a steam outlet in its upper end, steam and water separating means in the path of steam flow to said outlet, and means in said casing for washing the steam with water of greater purity than the water from which the steam was generated, said washing means being connected to and arranged to receive the drainage of said separating means.

21. Steam generating apparatus comprising a casing having a steam outlet at its upper end, steam and water separating means in the path of steam flow to said outlet, and means in said casing for washing the steam with water of greater purity than the water from which the steam was generated, said washing means comprising an ejector, a conduit delivering feed water to said ejector to serve as the motive fluid therefor, and a drain conduit connecting said separating means to said ejector for delivering separated water to said washing means.

22. Apparatus for purifying a wet gas comprising a casing having a gas outlet, and a gas and liquid separator in said casing having plates arranged to form a substantially cruciform housing, a separator section in each arm of said housing including a series of corrugated plates having their corrugations extending substantially transversely of the general direction of gas flow relative thereto and forming narrow undulating channels therebetween, means forming a gas space in said housing between said separator sections and communicating with the gas discharge ends of said channels, and means connecting said housing gas space to said outlet.

JAMES FLETCHER.
LAMBERT KOOISTRA.